United States Patent
Posses et al.

[11] Patent Number: 5,903,135
[45] Date of Patent: May 11, 1999

[54] CELLULAR TELEPHONE BATTERY RECHARGER DEVICE WITH DIGITAL RECORDING SYSTEM AND SPEAKER PHONE

[76] Inventors: Joao Carlos Teixeira Posses; Ivan Bertazzo, both of Conselheiro Brotero Street, No. 1140, 15° Floor, Sao Paulo, Brazil

[21] Appl. No.: 09/168,813

[22] Filed: Oct. 8, 1998

Related U.S. Application Data

[60] Provisional application No. 60/065,123, Nov. 12, 1997.

[51] Int. Cl.⁶ .................................................. H01M 10/46
[52] U.S. Cl. ................................................... 320/114
[58] Field of Search .................................. 320/107, 112, 320/113, 114, 115, FOR 101; 379/58, 446, 447, 454; 455/344, 345, 346, 347, 350; D13/103, 107, 108

[56] References Cited

U.S. PATENT DOCUMENTS 5,333,176  7/1994  Burke et al. ............................... 379/58
5,459,702  10/1995  Greenspan ................................. 369/25
5,479,479  12/1995  Braitberg et al. ......................... 379/58
5,795,088  8/1998  Stamegna ................................. 455/345

*Primary Examiner*—Edward H. Tso
*Attorney, Agent, or Firm*—Head, Johnson & Kachigian

[57] ABSTRACT

A digital recording system for messages received or to be sent in a cellular telephone batteries recharger with living voice speaker phone comprising a batteries recharger device of the cellular telephone. The device is equipped with living voice speaker phone system, the panel of which has a gridded area for the sound to exit from the speaker and a functioning indicator LED (POWER). Upon pressing the recording push-button (REC), the messages spoken by the user in the microphone or those received by the cellular telephone start to be recorded in digital memory, the existence of said messages will be indicated by LED and, upon pressing the play push-button (PLAY), the message will be reproduced by the speaker. When the cellular telephone is turned on and in contact with its destination, the message will be sent, development of which aims to allow digital recording of messages recorded by the cellular telephone or even the recording for later consultation in the same device used to recharge the dry battery of the cellular telephone.

6 Claims, 3 Drawing Sheets

CELLULAR TELEPHONE BATTERY RECHARGER DEVICE WITH DIGITAL RECORDING SYSTEM AND SPEAKER PHONE

CROSS REFERENCE TO RELATED APPLICATION

This application is based on Provisional Patent Application No. 60/065,123 entitled DIGITAL RECORDING SYSTEM FOR MESSAGES RECEIVED OR TO BE SENT APPLIED IN CELLULAR TELEPHONE BATTERIES RECHARGED WITH LIVING VOICE, filed Nov. 12, 1997.

BACKGROUND OF THE INVENTION

1. Field of the Invention

The present invention is directed to a cellular telephone battery recharger device which includes a digital recording system for messages received or to be sent and a speaker phone for hands-free operation.

2. Prior Art

Cellular telephone systems use a network of relatively low-powered radio transmitters and receivers that cover a given area. This network is made up of a number of cells, each with a combined receiver and transmitter called a transceiver at the center of the cell. An antenna radiates a wireless signal to and over the desired area. Each cell with its transceiver, antenna and controlling equipment acts as a relay and an interface between the user's cellular telephone handset, which is also a transceiver, and local telephone service company. Radio transmissions in cellular systems use frequency-module or FM signals. The frequency of the signal is changed to impress information on the carrier wave. Regular cellular systems operate in the 800 MHZ section of the spectrum while newer personal communications services or PCS operate in the 1900 MHZ section of the spectrum.

When a mobile telephone set is first turned on, it enters an "idle" state. In this condition, a mobile telephone set only performs electronic housekeeping routines that are necessary to prepare it to receive or initiate calls. A logic unit in the mobile handset directs the receiver unit to scan what are called the "set up channels" to find the one with the strongest signal which is normally the closest cell site. Having found the channel or frequency that gives the strongest signal, the receiver passes that information on to the logic unit. This component directs the receiver to lock on to that frequency and monitor it continuously or until it receives instructions to switch to another channel. At frequent intervals, the receiver will rescan the set up channels to see if a different channel will give a better quality signal.

When the mobile telephone unit receives a call, the cell site acknowledges that the signal tone has stopped. The cell site signals this back to the mobile telephone switching office or switching unit which then connects the incoming call to the mobile telephone unit.

The comfort provided by the use of mobile telephony devices, commonly called cellular telephone, is widely known. It is common to see people talking on their cellular telephones for informal conversation or for business purposes, which shows how important this kind of telephone service is.

For assuring their mobility, mobile telephones require the use of small dry rechargeable batteries that, when the user is at home, office or moving on the streets in his/her automobile, he/she plugs in an appropriate connector on the cellular telephone and another one on the wall outlet or vehicle cigarette lighter.

It is common to see people driving and, at the same time, talking on the cellular telephone. This has increased the cases of traffic accidents caused by the driver's lack of attention, often because people have one hand busy holding the telephone. Due to the increase in accidents, some traffic authorities prohibit the use of a cellular telephony device while driving.

Therefore, several manufacturers of devices and accessories for cellular telephony attempted to develop solutions which would prevent the driver from holding the device while talking and driving. One of these solutions consists in an earphone whose wire, connected to the cellular telephone, has, next to the user's mouth, a small but potent microphone.

Another solution consists in the application of a microphone and a speaker on the batteries recharger device connected to the vehicle cigarette lighter. The problem remains that for writing down any information, the driver must have paper and a pen in the car's glove compartment or in any appropriate support. When the driver wishes to write down said information, he/she has to quickly stop the car to avoid eventual accidents.

The present disclosure relates to a digital recording system for messages received or to be sent applied in cellular telephone batteries recharger with living voice, development of which aims to allow digital recording of messages received by the cellular telephone or the transmission of messages recorded by the cellular telephone or even the recording for later consultation in the same device used to recharge the dry battery of the cellular telephone.

In the present disclosure, the digital recording system for messages received or to be sent applied in cellular telephone batteries recharger with living voice incorporates, in its electronic circuit, a memory or set of volatile memories for recording the messages recorded by the user for later rememorization, or to be sent by the cellular telephone, or for recording part of the conversation received by the user in its device.

The time of recording will depend on the constant progresses made by the electronic components manufacturers, which are manufacturing even smaller, more efficient and cheaper products.

In this way, a product is obtained for incorporating several extremely practical functions for the cellular telephone users who, due to the circumstances, have to drive and talk on the telephone at the same time.

Accordingly, it is a principal object and purpose of the present invention to provide a battery recharger device which incorporates a digital message recording system and a speaker phone.

SUMMARY OF THE INVENTION

The present invention is directed to a cellular telephone battery recharger device having a digital recording system and a speaker phone system. The device includes a battery recharger for connection to a cellular telephone and a terminal for connection and contact with a vehicle cigarette lighter through a plug.

The device includes a panel on a shell having a gridded cover area for the sound to exit from a speaker. The vehicle lighter plug is integral with the shell. A connection through the vehicle lighter plug to a power supply regulator delivers between 5 and 10 volts of voltage to the cellular telephone through a line. A microphone located within the cellular telephone terminal is connected to a microphone amplifier to increase the audio signal to approximately 30 dB. The audio output from the microphone amplifier is delivered both to the cellular telephone and to the digital recorder. A power amplifier receives an audio signal coming from the cellular telephone via a line. The power amplifier is connected to the speaker phone.

The message recording function can be initiated by pressing the REC button to record a conversation or record a message. Upon pressing the REC button, messages spoken by the user into the microphone or those received by the cellular telephone begin or start to be recorded in digital memory. The existence of any messages will be indicated by LED (message). Upon pressing a PLAY push-button (PLAY) the messages will be reproduced and played through the speaker phone. In order to hear an existing message, the user will press the PLAY button.

DETAILED DESCRIPTION OF THE PREFERRED EMBODIMENTS

Figure 1:
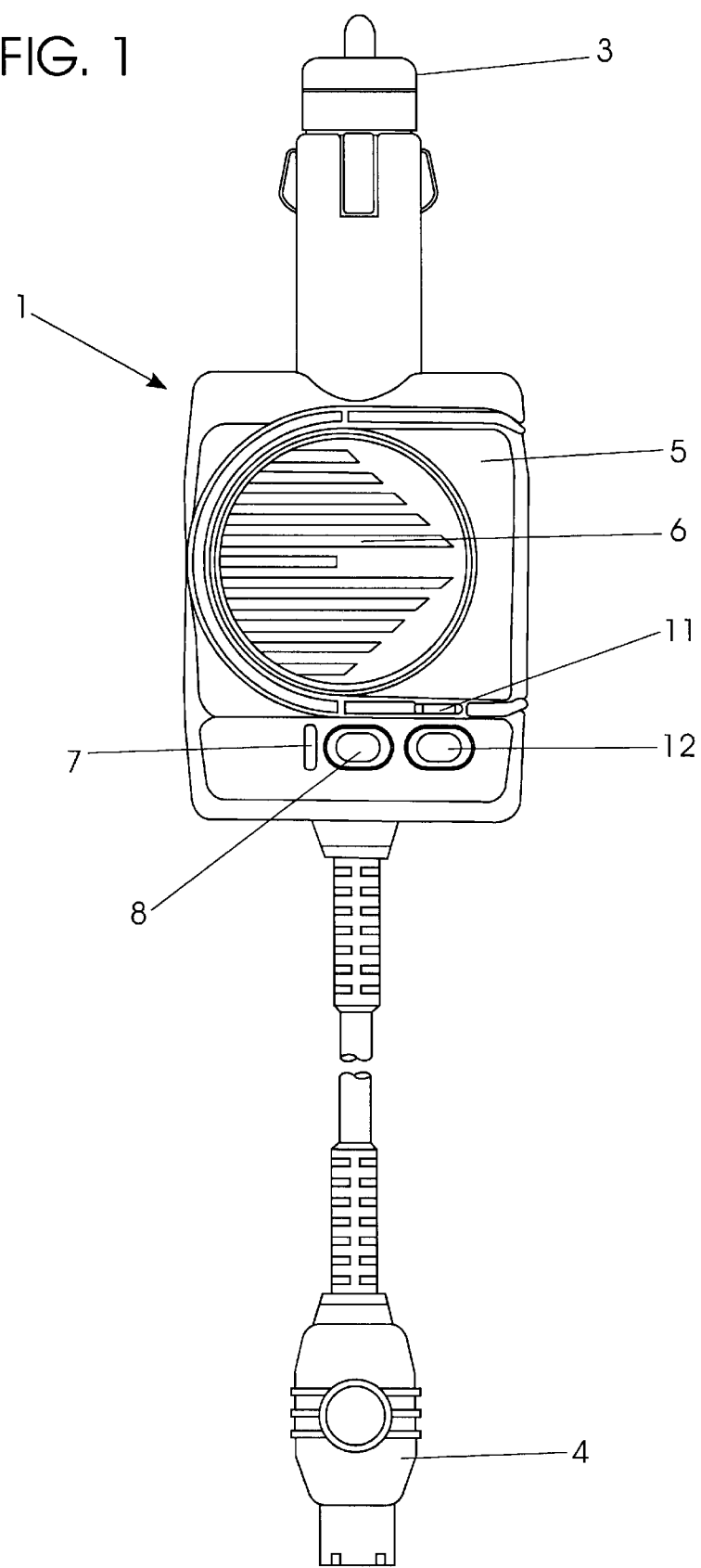
FIG. 1 shows, in front view, a cellular telephone battery recharger constructed in accordance with the present invention, observing the ON LEDs (POWER) and the existence of messages recorded in the memory and the recording (REC) and play (PLAY) push-buttons.
Figure 2:
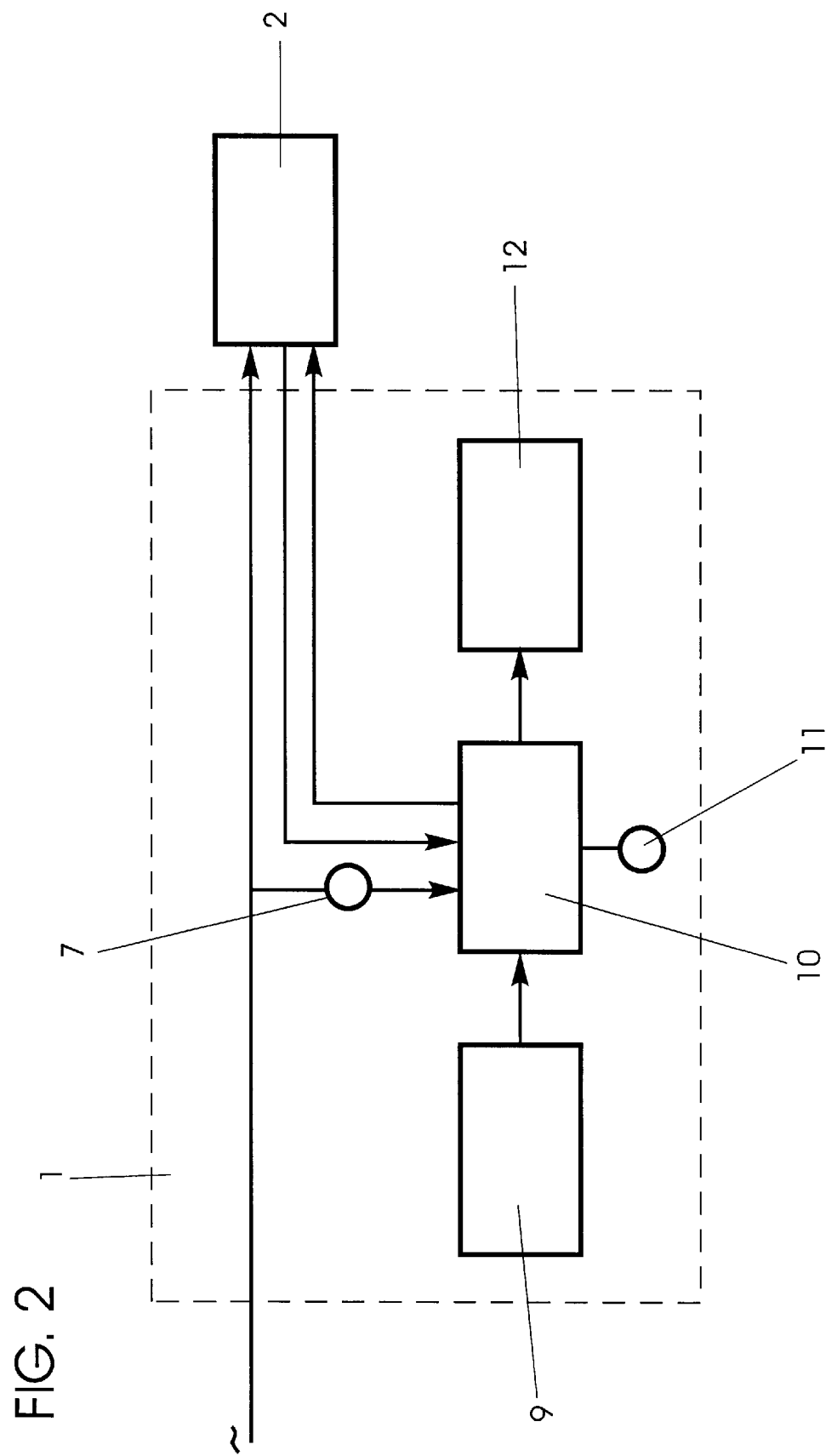
FIG. 2 shows, in a schematic view, the functioning system of the recording assembly applied in the cellular telephone battery recharger equipped with speaker phone.

Referring to the drawings in detail, FIG. 1 is a perspective view of a preferred embodiment of the present invention, while FIG. 2 is a block diagram of the invention.

The present disclosure for a digital recording system for messages received or to be sent applied and contained in a cellular telephone battery recharger with living voice speaker phone comprises a battery recharger device 1 for connection to a cellular telephone 2 (not shown in FIG. 1). The device 1 is equipped with living voice speaker phone system and a terminal for connection and contact with a vehicle cigarette lighter through a plug 3 and an electric cable having a terminal 4 for connection to the cellular telephony device.

The device 1 has a panel 5 on a shell 30 having a gridded cover area for the sound to exit from the speaker 6. The vehicle lighter plug 3 is integral with the shell 30. A functioning indicator light emitting diode LED (POWER) 7 is shown indicating power is received to the device.

Upon pressing the recording push-button (REC) 8, the messages spoken by the user into the microphone 9 or those received by the cellular telephone 2 start to be recorded in digital memory 10. The existence of the messages will be indicated by LED (message) 11 and, upon pressing the play push-button (PLAY) 12, the messages will be reproduced by the speaker 6. In case the cellular telephone 2 is turned on or in contact with its destination, the message will be sent.

The speaker phone allows the driver to speak on the telephone and to drive at the same time.

Figure 3:
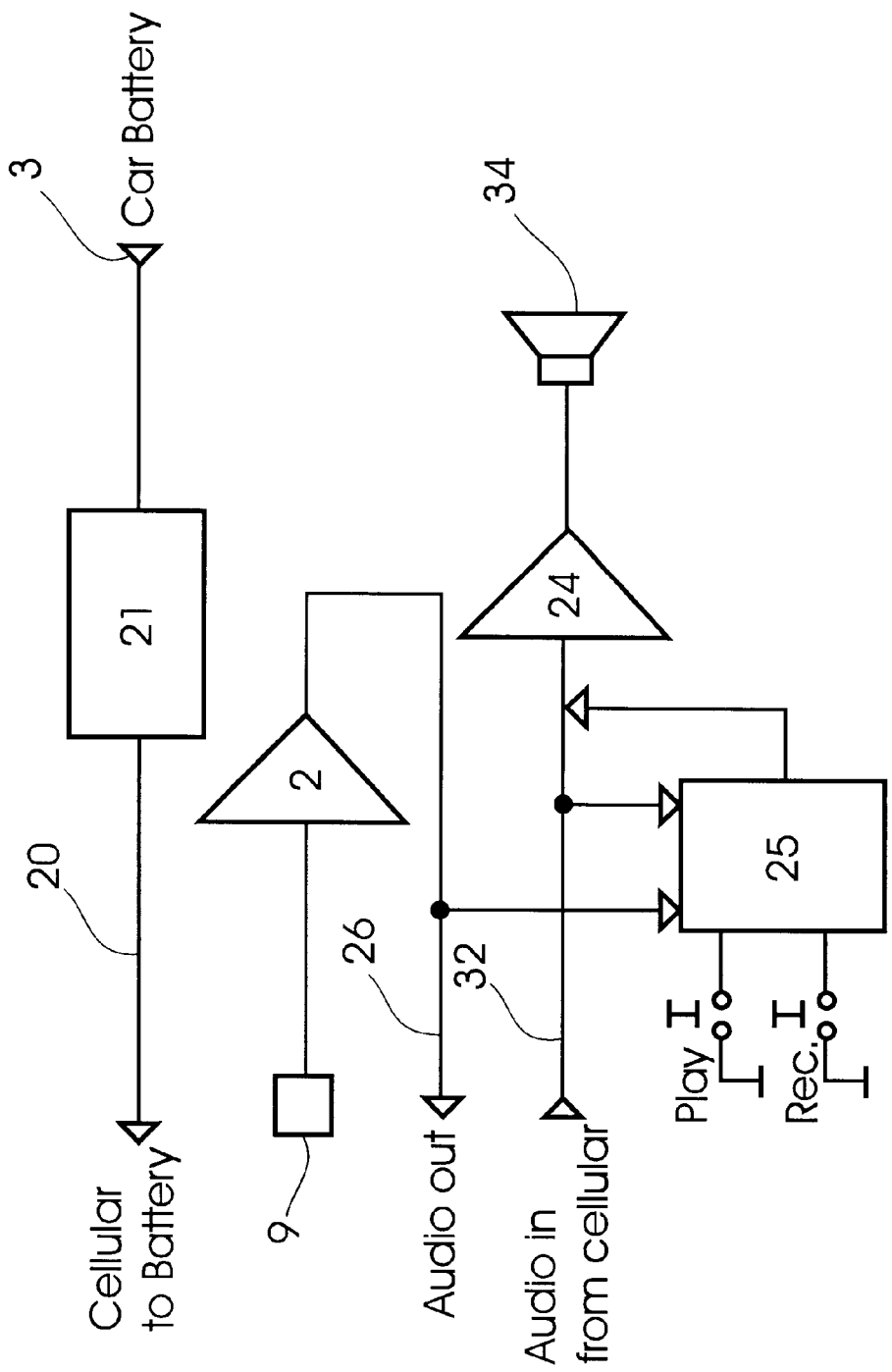
FIG. 3 is a schematic of the circuits of the cellular telephone battery recharger device having a digital recording system and a speaker phone system of the present invention.

FIG. 3 is a simplified schematic of the circuits of the battery recharger device. A connection through plug 3 to a power supply regulator 21 delivers between 5 to 10 volts of voltage to the cellular phone through line 20. A microphone 9 is connected to a microphone amplifier 2 to increase the audio signal 30 dB. The audio output is delivered both to the cellular telephone, shown by line 26 and to the recorder 25.

A power amplifier 24 receives an audio signal from the cellular telephone via line 32. The power amplifier 24 is connected to the speaker phone 34.

In order to install the device, remove the cigarette lighter of the vehicle and connect the VS-90 in its place. After that, it connects to the plug opening of the telephone.

The VS-90 effects the charge quickly in the battery of its telephone while it is connected. A brief "beeper" sounds and the bars "running" indicate that the device is being charged.

The function of message recording can be set in motion by pressing the REC button, to record the conversation or the message. The time available for recording is 20 seconds. In the event the button is pressed for longer than 20 seconds, the last 20 seconds will be recorded. To hear the message, press the PLAY button. Pressing the button REC deletes the message. A message is not lost if the VS-90 is detached from its electrical source (or from the cigarette lighter).

In order to detach it from the telephone, press the constraints in the laterals of the plug and pull.

Whereas, the present invention has been described in relation to the drawings attached hereto, it should be understood that other and further modifications, apart from those shown or suggested herein, may be made within the spirit and scope of this invention.

What is claimed is:

1. A battery recharger device for a cellular telephone which device includes a recording system and a speaker phone system, which device comprises:

a power supply connector having a power supply regulator;

a cellular phone terminal connection;

a microphone on said device which supplies an audio output to said cellular telephone and to said digital recording system;

a power amplifier and a speaker phone which receives audio input from said cellular telephone and from said microphone; and wherein said recording system is connected to said audio input from said cellular telephone.

2. A battery recharger device as set forth in claim 1 wherein said power supply connector is connected to a battery of a vehicle.

3. A battery recharger device as set forth in claim 2 wherein said power supply connector is integral with a shell which encloses said power amplifier and said speaker phone.

4. A battery recharger device as set forth in claim 1 wherein said recording system includes a memory to retain audio input from said cellular telephone or from said device microphone.

5. A battery recharger device as set forth in claim 1 wherein said recording system is a digital recorder having a microprocessor.

6. A battery recharger device as set forth in claim 1 wherein said microphone is built into said power supply connector.

* * * * *